Dec. 23, 1958

R. H. APPLIN ET AL
VOLTAGE REGULATOR WITH NON-LINEAR
NETWORKS IN CONTROL CIRCUIT 2,866,151

Filed Jan. 18, 1955

INVENTORS
RICHARD H. APPLIN
RICHARD E. LANGWORTHY
WILBUR D. MATHEWS
By Bulinder Mattingly & Huntley
Attorneys

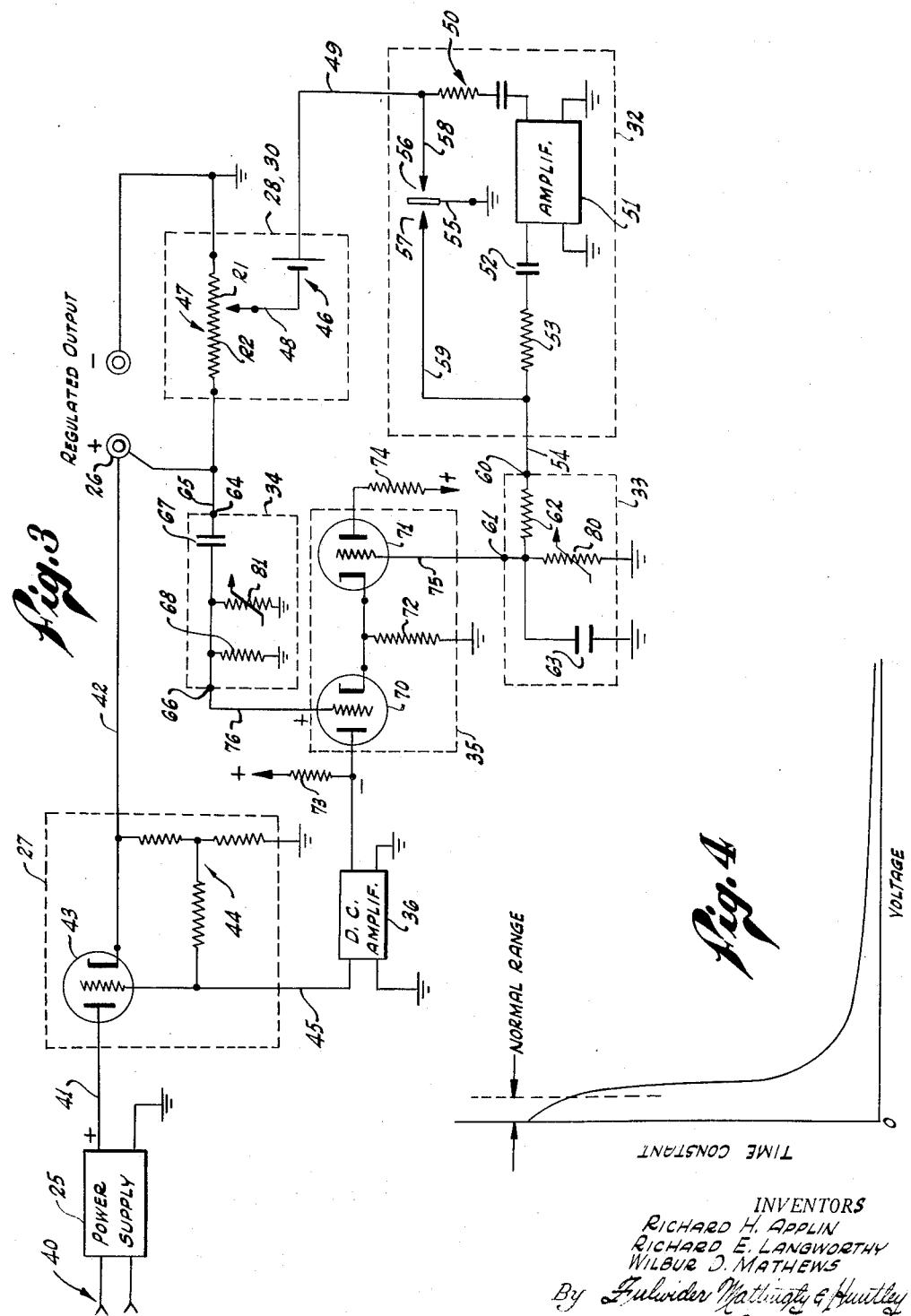

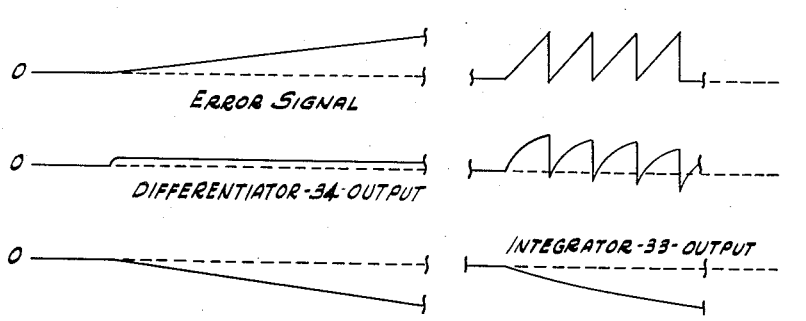
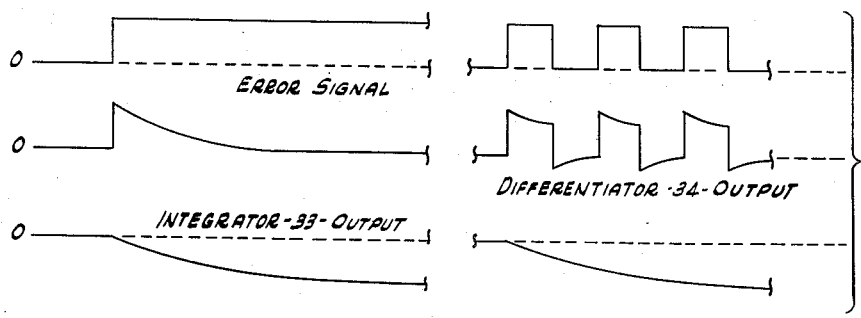
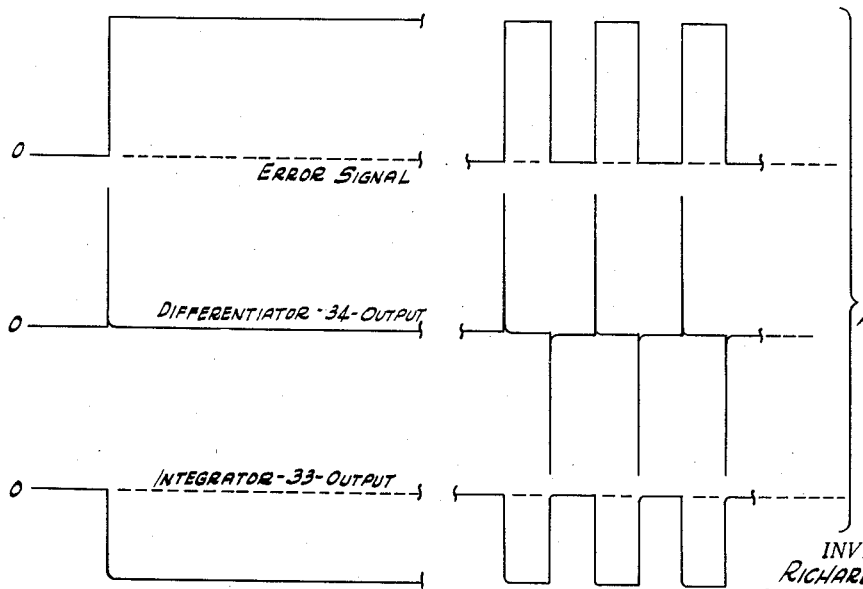

United States Patent Office 2,866,151
Patented Dec. 23, 1958

2,866,151

VOLTAGE REGULATOR WITH NON-LINEAR NETWORKS IN CONTROL CIRCUIT

Richard H. Applin, San Diego, Richard E. Langworthy, La Mesa, and Wilbur D. Mathews, San Diego, Calif., assignors to Kay Lab, San Diego, Calif., a corporation of California Application January 18, 1955, Serial No. 482,585

17 Claims. (Cl. 323—22)

This invention relates to servo systems and has particular reference to an electrically controlled servo system having a non-linear network in the feedback loop, the invention finding particular utility when used in regulated power supplies, instrument calibrators, and the like.

Servo type control systems generally comprise a modulator connected to a power source and controlled by an input quantity in such wise as to deliver an output quantity equal to or bearing a fixed relation to the input quantity. Any difference between the input and the output quantities is detected and applied through a feedback loop to control the modulator to thereby correct the output quantity and eliminate the difference. The many and varied uses of servo type control systems today often require great sensitivity and accuracy; that is the ability to detect and respond to small differences between the input and output quantities and maintain the output quantity at the desired value within close limits.

In order to realize the required sensitivity, a high degree of amplification is required in the feed-back loop so that the error signal (proportional to the difference between the input and output quantities) may exercise the required control over the modulator. However, as the feed-back loop gain is increased, the system tolerance for large errors is reduced, and the stability of the system may be impaired. To offset this instability, servo systems often employ heavy damping, using amplifiers having time constants sufficiently long to secure the required stability. As a consequence, such systems have a low tolerance for large errors and may lose control entirely whenever large errors occur. Having so lost control, such systems, because of the heavy damping employed, require a very long time to regain control, and, in some cases, may lose control permanently.

It is therefore an object of this invention to provide a servo system including a high gain feedback loop which overcomes the above-mentioned disadvantages by reason of a variable speed of response.

It is another object of this invention to provide a servo system of the character set forth in the preceding paragraphs in which the internal damping is light for small errors and heavy for large errors.

It is another object to provide a servo system of the character set forth in the preceding paragraphs which includes a non-linear damping network having a long-time constant for small error signals and a short-time constant for large signals.

It is also an object of this invention to provide a servo system of the character set forth in the foregoing, wherein said servo system comprises a voltage regulator, and in which said non-linear network comprises a differentiating circuit, normally responsive principally to a change in the magnitude of the error signal.

It is a still further object of this invention to provide a voltage regulator of the character set forth in the preceding paragraph in which said non-linear network comprises an integrating circuit normally responsive principally to the magnitude and duration of the error signal.

It is another object of this invention to provide a voltage regulator of the character set forth in the preceding paragraphs in which said non-linear network comprises a resistance-capacitance filter including a semi-conductor having an electrical resistance which varies as a function of the voltage thereacross.

Other objects and advantages of this invention will become apparent upon a consideration of the following specification, read in connection with the accompanying drawings, wherein:

Figure 3 is a schematic diagram illustrating in detail the construction and arrangement of certain of the components indicated in block diagram form in Figure 2;

Figure 4 is a graph representing the relationship between the time constant of the non-linear networks of Figure 3 and the voltage applied to those networks; and, Figures 5, 6, and 7 illustrate graphically the character of the response of the non-linear networks to various types of error signals.

Figure 1:
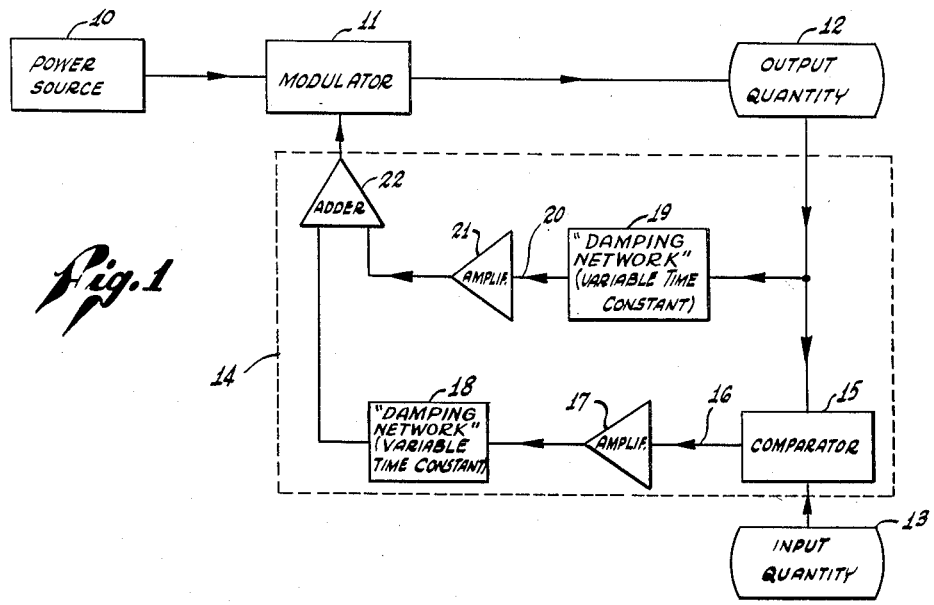
Figure 1 is a block diagram illustrating schematically a servo control system having variable time constant networks included in the feedback loop arrangement.

Referring to the drawings, Figure 1 illustrates in block diagram form a dual loop servo control system. In such a system, power supplied by a power source 10 is controlled by a modulator 11 to deliver an output quantity represented diagrammatically at 12. The modulator 11 is controlled jointly by the output quantity 12 and an input quantity represented diagrammatically at 13, the control being effected by means of a feedback loop comprising the circuits and instrumentalities enclosed by the dashed line bearing the reference character 14.

Conventionally, in closed loop servo systems, the feedback loop 14 includes a comparator 15 for comparing the output quantity 12 with the input quantity 13 to produce at its output 16 an error signal proportional to any difference between the input quantity 13 and output quantity 12. Conventionally, this error signal is amplified by an amplifier 17 and applied to control the modulator 11. According to the present invention, however, a damping network 18 is interposed between the amplifier 17 and the modulator 11, the network 18 incorporating a variable time constant so as to provide a shorter time constant to large error signals than is provided in the case of smaller error signals.

Conventional servo systems often include a second loop such as that represented in Figure 1 as comprising a damping network 19 connected to produce at its output 20 a correction signal normally proportional to the rate of any change in the output quantity 12. The correction signal is normally amplified as by means of a suitable amplifier 21 and added to the output of the amplifier 17 as by means of an adder 22 comprising one of a number of conventional summing devices. According to the present invention, however, the second feedback loop of Figure 1 differs from the conventional in providing the network 19 with a variable time constant which is much shorter for large changes in magnitude than it is for small changes.

In the normal operation of the system shown in Figure 1, where the differences between the output quantity and the input quantity are small at all times, the first mentioned feedback loop 15—18 may deliver a control signal to the modulator 11 which follows the low frequency changes in the error signal and which corresponds to the integral or cumulative effect of high frequency changes.

The second feedback loop 19—21 may apply to the modulator 11 a control signal which follows the high frequency changes and corresponds to the derivative of the rate of change of error signals which vary at a low frequency. However, when the difference between the input quantity 13 and the output quantity 12 is large and the rate of change in error signal in reaching this large difference is large also, the time constant of the networks 18 and 19 become very short. Because of this very short time constant, the upper feedback loop 19—21 exercises substantially no control over the modulator 11, and the lower feedback loop 15—18 applies to the modulator 11 a control signal which follows the error signal. Although such error signal may be sufficiently large to block the amplifier 17, the short time constant of the network 18 allows the circuit to recover very quickly.

Figure 2:
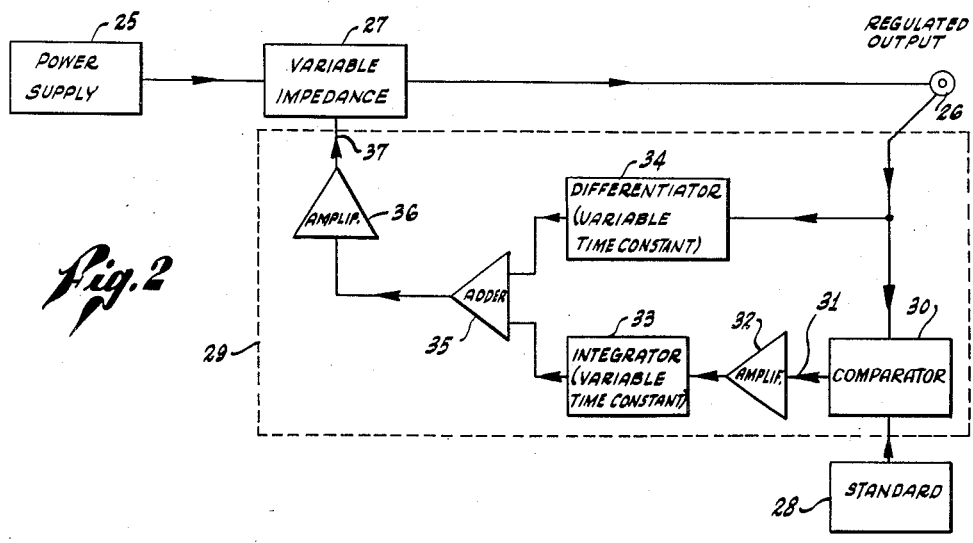
Figure 2 is a block diagram illustrating the principles of the invention as embodied in a voltage regulator.

Figure 2 illustrates in block diagram form a regulated power supply system embodying the principles above discussed with reference to Figure 1. The power supply system illustrated in Figure 2 includes a supply device 25 for supplying a voltage somewhat in excess of the maximum desired regulated voltage. The output of the supply 25 is connected to an output terminal 26 through an electrically controlled variable impedance 27. The variable impedance 27 is controlled jointly by the regulated output voltage appearing on terminal 26 and a reference voltage which may be supplied by a suitable standard 28. The control is effected by a feedback loop constituting the circuits and instrumentalities enclosed within the dashed line 29. This feedback loop is similar to the feedback loop 14 described with reference to Figure 1 and includes a comparator 30 for comparing the reference voltage with the output voltage to deliver at its output 31 an error voltage. The error voltage is amplified as by means of an amplifier 32, the output of which is passed through an integrating filter 33 having a variable time constant. Similarly, the regulated voltage taken from the terminal 26 is passed through a differentiating network 34 also having a variable time constant as previously described. The outputs of the filters 33 and 34 are added in a suitable summing circuit 35, the resulting signal being suitably amplified as by means of an amplifier 36 and applied as indicated at 37 to control the variable impedance 27.

In the circuit arrangement shown in Figure 2, the lower feedback loop 30—33 serves to control with respect to low frequency variations in the regulated output whereas high frequency variations are controlled by the signals passing through the differentiating network 34. In the event of a large change in the relation between the output voltage on terminal 26 and the reference voltage as supplied by the standard 28, the upper loop through the differentiating network 34 becomes ineffective and the control signal supplied by the lower loop follows the error signal. In this case also, the short time constant of the filter 33 provides for a rapid recovery in the event the amplifier 32 should be blocked by the high input signal.

A specific embodiment of the invention as applied to a regulated direct current supply is illustrated in detail in Figure 3. Various portions of the circuit arrangement shown in Figure 3 correspond to the various elements of Figure 2 and are enclosed in dashed lines or otherwise suitably identified with the same reference characters as are used in Figure 2. According to the invention as shown in Figure 3, the supply device 25 may comprise a conventional rectifier-filter arrangement adapted for connection to a commercial source of alternating current power as indicated at 40. The unregulated direct current voltage supplied by the supply 25 is connected as shown at 41 and 42 to the output terminal 26 through the variable impedance 27. The variable impedance 27 may comprise a thermionic tube 43, the anode of which is connected to conductor 41 and the cathode of which is connected to conductor 42. The grid of the tube 43 is normally held at a suitable potential with respect to the cathode as by means of a resistance network such as that represented generally by the reference characters 44 in Figure 3. This grid voltage is under the control of the amplifier 36, the output of which is connected to the grid of the tube 43 as by means of a conductor 45.

The vacuum tube 43 operates as a variable resistance, the anode-cathode resistance being increased by shifting the grid voltage in the negative direction and being reduced by shifting the grid voltage in the positive direction.

Since the stability of the regulated output will be no better than the stability of the reference standard, it is important to use a reference standard of extreme stability. Accordingly, the input means for supplying the standard reference voltage preferably comprises a mercury-cadmium standard cell 46. Such a cell develops a voltage of about one volt which does not vary by more than 0.01%. By protecting the cell 46 against shocks, vibrations, and rapid changes in temperature, the reference voltage may be maintained constant to within 0.005% or less for a temperature range of from 4° C. to 40° C.

It will be understood that the regulated voltage to be supplied by the load terminal 26 will normally be greatly in excess of one volt; i. e., of the order of a few hundred volts. It is necessary, therefore, to compare the reference voltage delivered by the cell 46 with an appropriate fraction of the output voltage. To this end, a voltage divider such as a potentiometer 47 is connected across the regulated output, the adjustable arm of the potentiometer being connected to one terminal of the cell 46 as indicated at 48, the other terminal of the cell being connected as by means of conductor 49 to the input of the amplifier 32. The adjustable arm of the potentiometer 47 divides the potentiometer resistance into two parts R1 and R2 such that the ratio of the total resistance $(R1+R2)$ to the part R1 is equal to the ratio of the desired regulated output voltage to the reference voltage. The negative terminal of cell 46 is connected to conductor 48 so that the magnitude and polarity of the voltage appearing on conductor 49 will correspond in magnitude and polarity to the difference between the standard reference voltage and the voltage on conductor 48. In this way, the potentiometer 47 and the described connections to the standard cell 46 constitute a comparator supplying to the input 49 of the amplifier 32 an error signal which is proportional to the difference between the regulated voltage on terminal 26 and the desired value called for by the setting of the potentiometer 47. Also, changes in the regulated voltage at the load terminal 26 will cause the error voltage on conductor 49 to change in a corresponding direction. It will be understood of course that the potentiometer 47 constitutes a means for manually selecting the voltage desired to be supplied at the load terminal 26. For example, if the standard cell develops one volt, and the potentiometer 47 is set so that the voltage on conductor 48 is 1/500 of the total voltage applied to the potentiometer 47, the device will operate to maintain 500 volts at the load terminal 26. If the potentiometer be adjusted to a position where the voltage on conductor 48 is 1/100 of the total voltage applied to the potentiometer 47, the device will operate to supply a regulated output of 100 volts.

The amplifier 32 preferably comprises a contact modulated A. C. amplifier so that D. C. drift, such as results from operating voltage fluctuations, is substantially eliminated. Accordingly, the error signal appearing on the conductor 49 is applied through suitable A. C. coupling 50 to the input of a multi-stage resistance coupled A. C. amplifier 51. The output of the amplifier 51 is coupled through a condenser 52 and resistance 53 to an output conductor 54. A vibrating reed contact 55, serving to connect to ground alternately stationary contacts 56 and 57, is used to supply an alternating potential input to the amplifier 51 and to rectify the amplifier output. The reed 55 may be driven by any suitable means—as for an example, by an electro-magnet supplied with 60-cycle A. C. power. Contact 56 is connected as indicated at 58 to conductor 49 to ground the conductor 49 sixty times per second to supply a 60-cycle A. C. input to the amplifier 51. The amplitude of this A. C. input signal corresponds to the magnitude of the error signal or conductor 49, and its phase reverses with polarity reversals of the error signal. The contact 57 is connected as indicated at 59 to the output conductor 54 so as to ground the output sixty times per second. This serves to rectify the A. C. output of amplifier 51 by grounding the output during one-half of each cycle of the output signal. The resulting pulsating D. C. signal is proportional in magnitude to the error signal and reverses polarity whenever the polarity of the error signal reverses. By using an even number of stages in the amplifier 51, the polarity of the pulsating D. S. signal appearing at the output 54 is caused to be opposite to the polarity of the error voltage on conductor 49.

The output delivered by the amplifier 32 is applied to the summing network 35 through the filter or integrator 33, which will be understood to have an input terminal 60 and an output terminal 61. The filter 33 comprises a resistor 62 connected in a series between the input and output terminals 60 and 61 and a condenser 63 connected between the output terminal 61 and the ground. The resistance and capacitance of the elements 62 and 63 are selected to give the circuit a time constant of about 20 seconds. This serves to filter out the 60-cycle A. C. component of the pulsating D. C. voltage produced by the amplifier 32 so that a steady ripple-free voltage appears at the output terminal 61 comprising, in most cases, a greatly amplified version of the error signal appearing on conductor 49.

The differentiating network 34 will be understood to have an input terminal 64 which is connected as indicated at 65 to the load terminal 26, and to have also an output terminal 66. The filter network 34 comprises a condenser 67 connected in series between the input and output terminals 64 and 66 and a resistance element 68 connected between the output terminal 66 and the ground. The values of capacitance and resistance of the elements 67 and 68 are preferably selected to give the circuit a time constant of about one-half second. Thus, the correction signal appearing at the output terminal 66 normally follows any high frequency changes in the regulated voltage at the load terminal 26.

The amplified error signal supplied by the output terminal 61 of filter 33 and the correction signal supplied by the output terminal 66 of the filter 34 are added in the summing network 35. This network comprises a pair of vacuum tubes 70 and 71, each having at least an anode, a grid, and a cathode. The cathodes of the tubes are inter-connected with each other and are connected to ground through a cathode load resistance 72. The anodes are independently connected to a suitable source of direct operating potential through load resistances 73 and 74, respectively. The amplifier error signal is applied as indicated at 75 to the grid of tube 71 and the correction signal is applied as indicated at 76 to the grid of tube 70. The signal at the anode of tube 70 is the sum of these two input signals.

The mode of operation of the summing circuit 35 may be seen by assuming that the regulated output voltage shifts in the positive direction. This causes a negative shift in the amplified error voltage which will reduce the plate current drawn by the tube 71 and shift in the negative direction the voltage at the cathode of that tube and hence shift in a similar direction the voltage at the cathode of tube 70. The negative shift in cathode voltage of tube 70 causes an increased plate current, which by reason of the voltage drop in the plate load resistance 73 causes the plate voltage of tube 70 to shift in the negative direction. This negative shift of the plate voltage of tube 70 is increased by a shift in the positive direction of the voltage at the output terminal 66 of the filter 34, since a positive shift in grid voltage will also increase the plate current drawn by the tube 70. As a consequence, the device 35 delivers an output signal in which are combined components representing the magnitude and algebraic sign of the error and the magnitude and algebraic sign of the change in the error. The polarity and direction of change of the output signal are such as to oppose the error from which the output signal is derived.

The plate of the tube 70 is connected as an input to the amplifier 36 which is preferably of the direct current or direct coupled type arranged to provide an output signal in phase with the input. Thus, a control voltage is applied to the control conductor 45 to increase or decrease the resistance of the tube 43 as may be required to correct the error in the regulated voltage at the load terminal 26.

It will be understood that the range of control which may be exercised by the vacuum tube 43 must be sufficient to appropriately control the voltage of the load terminal 26 for all load conditions from no load to full rated load, and for all permissible adjustments of the output voltage as governed by the setting of the potentiometer 47. In order to provide such a wide range of control and at the same time maintain within very close limits the magnitude of the regulated output voltage, it is necessary that the amplifiers 32 and 36 provide relatively high gains. It has been found that regulation to within 0.01% may be obtained providing a gain of about 90 db in the amplifier 32 and a gain of about 70 db in the amplifier 36.

As previously mentioned, the filters 33 and 34 are given a non-linear characteristic so that their time constant reduces with a substantial increase in applied voltage. This result is secured in the case of filter 33 by a non-linear resistor 80 connected between the output terminal 61 and ground. In a similar manner, a non-linear resistance 81 is used in the filter 34, being connected between the output terminal 66 and ground.

The non-linear resistors 80 and 81 comprise semiconductors such as silicon-carbide suitably compounded with a ceramic material and sintered or fused into a solid rigid element. Such resistors, which may be purchased on the open market under the trademarks Thyrite or Globar, have a resistance which varies as a function of the voltage across the resistor, the resistance reducing with increasing voltage. Usually, the relation between voltage and resistance is an exponential relationship, the resistance changing by a factor of one hundred or more for voltage changes of a few volts. For example, the resistance of a silicon-carbide resistor suitable for the described use may be changed from about 50 megohms to about 50,000 ohms by a change of about two volts. Thus, at low signal voltages, the integrating network 33 will have a time constant of about 20 seconds as previously described. However, an increase in signal of about two volts will so reduce the resistance of the resistor 80 as to reduce the time constant to less than one-tenth second. Similarly, the differentiating network 34, having a normal time constant of the order of one-half second, reduces its time constant in response to such an increase of voltage to one millisecond or less. The nature of this variation of the time constant with signal voltage is represented in graph form in Figure 4.

There is shown in Figures 5 and 6 the nature of the signals supplied by the filters 33 and 34 in response to low magnitude error signals of both low and high frequency and of both low and high rate of change. At such low signal levels, the non-linear resistances 80 and 81 exhibit an extremely high resistance. Under these conditions, the output of differentiator 34 follows the high frequency error signal and corresponds to the derivative of low frequency signals; whereas the output of the integrator 33 follows low frequency error signals and corresponds to the integral or cumulative effect of high frequency signals, as indicated in Figures 5 and 6. The sum of these output signals, appropriately amplified by amplifier 36, exercises such control over the variable impedance vacuum tube 43 as to maintain the regulated voltage at the output terminal 26 constant to within extremely close limits. However, if an extremely heavy load is suddenly applied or removed, or if the potentiometer 47 is adjusted to make a substantial change in the regulated output voltage, an error signal of large magnitude results. This signal may be sufficient to overload and block the amplifier 51. Ordinarily, blocking of the amplifier 51, combined with a long time constant of the order of twenty seconds in the filter 33, would paralyze the control system for a long time, causing the output voltage at terminal 26 to swing back and forth between wide limits. For example, with the resistors 80 and 81 omitted from the filters 33 and 34, it requires about ten minutes for the system to settle down and regain control after a substantial change in the adjustment of the potentiometer 47. With the non-linear resistors 80 and 81 installed as described, this time is reduced to a matter of three or four seconds. Such a reduction in the time required for the system to regain control results from the tremendous reduction in the time constants of the filter networks effected by the non-linear resistors under the high signal level conditions described.

Figure 7 of the drawings illustrates diagrammatically the character of the output signals delivered by the differentiator 34 and integrater 33 under such large error signal conditions, both for low and high frequencies. Because of the resulting short time constants, the output of the differentiator 34 is of such short duration as to have substantially no effect on the control of the series resistance tube 43, while the output of the integrating circuit 33 follows and corresponds to the input signal. Thus, when a change of the character indicated is encountered, a maximum control signal is applied to the tube 43. As soon as the output voltage passes the voltage corresponding to the setting of the potentiometer 47, the amplified error signal applied to the filter 33 immediately reflects reversal of the polarity of the error signal, materially reducing the magnitude of the output voltage swing. The output of the filter follows closely the input signal until the fluctuations in output are reduced to a very small value, thus permitting the system to regain control in a very short time through minimizing the hunting and oscillation which results from such a drastic change in operating conditions.

From the foregoing, it will be seen that this invention provides an improved servo control system characterized by the provision of a non-linear damping network in the feedback loop.

Attention is directed particularly to the use of non-linear damping networks in each of the feedback loops provided in the dual loop control system hereinabove described. In this connection, it will be understood that while the invention has been described with particular reference to a regulated D. C. power supply apparatus, the invention is applicable to any electrically controlled servo system which is or may be subjected to an excessively large command signal or to substantial overloading. In any such application, the invention provides the distinct advantage of allowing the use of extremely sensitive and accurate response to small changes in the output quantity. At the same time, the non-linear response characteristic thus imparted to the feedback loops provide for rapid recovery of the system whenever control is lost because of abnormally large error signals, thus causing the control system to regain control in an extremely short time.

While a preferred form of the invention has been illustrated and described herein, the invention is not to be limited to the details shown and described, except as defined in the appended claims.

We claim:
1. A servo control system comprising: a modulator for controlling the flow of power to provide an output quantity; comparator means for detecting a difference between said output quantity and an input quantity to produce an error signal representative of said difference; a high-gain feedback loop coupling said comparator means to said modulator for controlling said modulator in response to said error signal; and means in said feedback loop having a variable time constant, said last mentioned means including a non-linear element having an impedance which varies as a function of the potential thereacross.

2. The system of claim 1 in which the time constant of said last mentioned means is large for small error signals and small for large error signals.

3. A servo control system comprising: an electrically controlled modulator for controlling the flow of power to provide an output quantity; a comparator means for producing an error signal representative of any difference between said output quantity and an input quantity; amplifier means connected in a feedback loop between said comparator and said modulator for amplifying said error signal to provide a control signal for controlling said modulator; and filter means in said feedback loop, said filter means including a non-linear element having a resistance which varies as a function of the voltage thereacross whereby to provide a large time constant for small signals and a small time constant for large signals.

4. The system of claim 3 in which said comparator means produces error signals proportional to the magnitude of said difference, and in which said filter means comprises an integrating network characterized by a condenser connected as a shunt element of said filter means.

5. The system of claim 3 in which said filter means comprises a differentiating network characterized by a condenser connected as a series element of said filter means.

6. A servo control system comprising: an electrically controlled modulator for controlling the flow of power to provide an output quantity; an amplifier means having an output coupled to said modulator, and having two inputs; comparator means for producing an error signal representative of a difference between said output quantity and an input quantity; means connecting said comparator means to one of said inputs to define a first feedback loop between said modulator and said output quantity; differentiating means coupled between said modulator and the other of said inputs for applying to said other input a correction signal normally proportional to the rate of change of said output quantity to thereby define a second feedback loop; and non-linear means in at least one of said feedback loops providing a large time constant for small signals and a small time constant for large signals.

7. The system of claim 6 in which said non-linear means is connected to said differentiating means.

8. In a power supply unit having a source of power connected to supply power to a load terminal, a voltage regulator comprising: an electrically controlled variable impedance connected between said source and said terminal; a voltage divider connected to said load terminal for providing an output voltage proportional to the voltage at said terminal; input means for producing a fixed standard reference voltage; comparator means connected between said voltage divider and said input means for producing an error signal proportional to the difference between said output voltage and said reference voltage; a high gain feedback loop connecting said comparator means to control said variable impedance; and filter means in said loop, said filter means including a non-linear component providing a large time constant for small error signals and a small time constant for large error signals.

9. The combination of claim 8 in which said filter means comprises an integrating network including a semi-conductor having a resistance which varies as a function of the voltage thereacross.

10. The combination of claim 8 which includes a differentiating circuit connected to said load terminal for producing a correction signal normally proportional to the rate of change of voltage at said terminal, said differentiating circuit being connected to supply said correction signal to said feedback loop and including a semi-conductor having a resistance which varies as a function of the voltage thereacross.

11. A high gain feedback loop circuit for a voltage regulator having a source of power connected through an electrically controlled variable impedance to a load terminal, said loop circuit including a high gain amplifier and a filter for controlling said variable impedance, said filter comprising: a series element connected in series between the input and output of said filter, and a shunt element connected across said output, one of said elements comprising a resistor and the other of said elements comprising a condenser; and a semi-conductor having a resistance which varies as a function of the voltage thereacross connected in parallel with one of said elements.

12. A loop circuit according to claim 11 in which said semi-conductor is connected in shunt with said output.

13. A loop circuit according to claim 11 in which said series element comprises a condenser.

14. A loop circuit according to claim 11 in which said series element comprises a resistor.

15. A servo control system comprising: an electrically controlled modulator for controlling the flow of power to provide an output quantity; an amplifier means having an output coupled to said modulator, and having two inputs; comparator means for producing an error signal representative of a difference between said output quantity and an input quantity; means connecting said comparator means to one of said inputs to define a first feedback loop between said modulator and said output quantity; an integrating network in said first feedback loop; differentiating means coupled between said modulator and the other of said inputs for applying to said other input a correction signal normally proportional to the rate of change of said output quantity to thereby define a second feedback loop; and non-linear means in said first feedback loop connected to said integrating network and providing a large time constant for small signals and a small time constant for large signals.

16. A servo control system comprising: an electrically controlled modulator for controlling the flow of power to provide an output quantity; an amplifier means having an output coupled to said modulator, and having two inputs; comparator means for producing an error signal representative of the difference between said output quantity and an input quantity; means connecting said comparator means to one of said inputs to define a first feedback loop between said modulator and said output quantity; an integrating network in said first feedback loop having a large time constant for small signals and a small time constant for large signals; differentiating means coupled between said modulator and the other of said inputs for applying to said other input a correction signal normally proportional to the rate of change of said output quantity to thereby define a second feedback loop; and non-linear means in said second feedback loop providing a large time constant for small signals and a small time constant for large signals.

17. The system of claim 16 which includes another amplifying means connected between said comparator and said one input, and in which said integrating network is connected between said one input and the output of said other amplifying means.

References Cited in the file of this patent

UNITED STATES PATENTS

| | | |
|---|---|---|
| 2,425,002 | Pfleger | Aug. 5, 1946 |
| 2,593,066 | Singer | Apr. 15, 1952 |
| 2,624,039 | Jorgensen | Dec. 30, 1952 |
| 2,663,765 | Boisblanc | Dec. 22, 1953 |
| 2,697,194 | Brown | Dec. 14, 1954 |